June 28, 1932. W. A. HEITNER 1,864,729
HAND BRAKE
Filed July 14, 1930

Witness
Wm. Geiger

Inventor
William A. Heitner
By Joseph Harris
His Atty.

Patented June 28, 1932                                              1,864,729

UNITED STATES PATENT OFFICE

WILLIAM A. HEITNER, OF CHICAGO, ILLINOIS, ASSIGNOR TO W. H. MINER, INC., OF CHICAGO, ILLINOIS, A CORPORATION OF DELAWARE

HAND BRAKE

Application filed July 14, 1930. Serial No. 467,797.

This invention relates to improvements in hand brakes.

One object of the invention is to provide a simple and efficient hand brake mechanism of the power multiplying type, operated by a manually actuated hand wheel, wherein means is provided for preventing spinning of the hand wheel when the brakes are released, thereby protecting the brakeman from injury.

A further object of the invention is to provide in a hand brake mechanism of the character indicated, including power multiplying gearing operatively connecting the hand wheel and brake drum, wherein the gearing includes planetary elements normally locked against planetary movement while the brake is being applied, and having planetary movement during release to allow free running of the brake drum without imparting rotation to the hand wheel.

A still further object of the invention is to provide a hand brake of the hand wheel actuated type having power transmitting means between the hand wheel and chain winding drum, wherein the power transmitting means is connected to the hand wheel in such a manner as to permit free running of the brake drum when the brakes are released without rotation of the hand wheel, and wherein the hand wheel is held against rotation in an unwinding direction, thereby preventing accidental movement of the hand wheel and protecting the brakeman against injury.

Yet another object of the invention is to provide a hand brake mechanism of the character indicated in the preceding paragraph, wherein the locking means for holding the hand wheel is releasable to permit the brakeman to rotate the hand wheel to back up the brakes.

A more specific object of the invention is to provide in a hand brake of the character indicated, planetary gear means for preventing accidental rotation of the operating hand wheel in an unwinding direction, wherein the planetary gear means includes gears rotatable with the chain winding drum and hand wheel respectively, and gear means for transmitting the power from the hand wheel gear to the chain winding drum gear, including a rotary carrier for said gear means normally locked against movement and which is unlocked to release the brakes, thereby permitting rotation of the carrier and planetary rotation therewith of the gear means carried thereby with respect to the gears of the hand wheel and chain winding drum, thus allowing the hand wheel to remain idle during the free running of the chain winding drum.

Other objects of the invention will more clearly appear from the description and claims hereinafter following.

Figure 1:
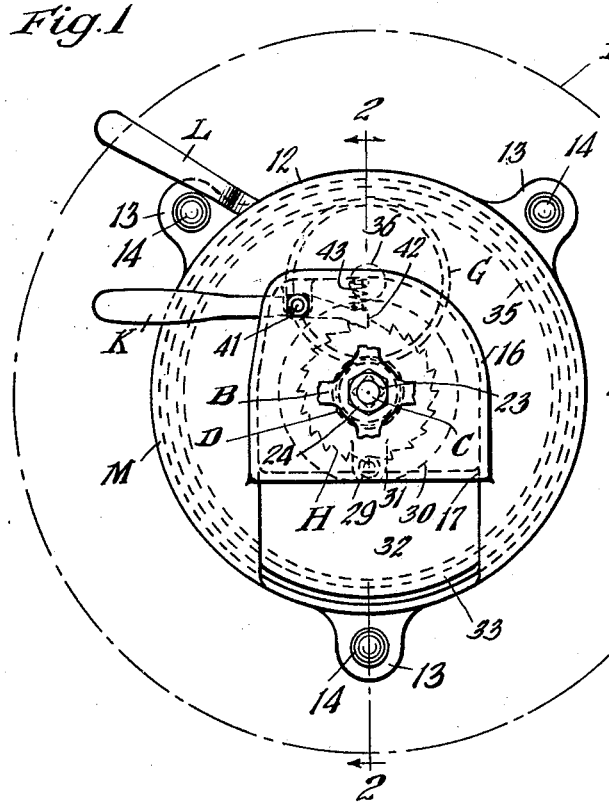
Figure 2:
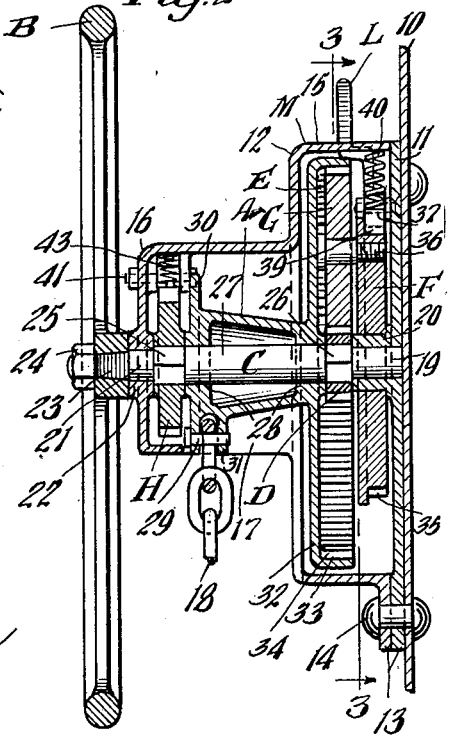
Figure 3:
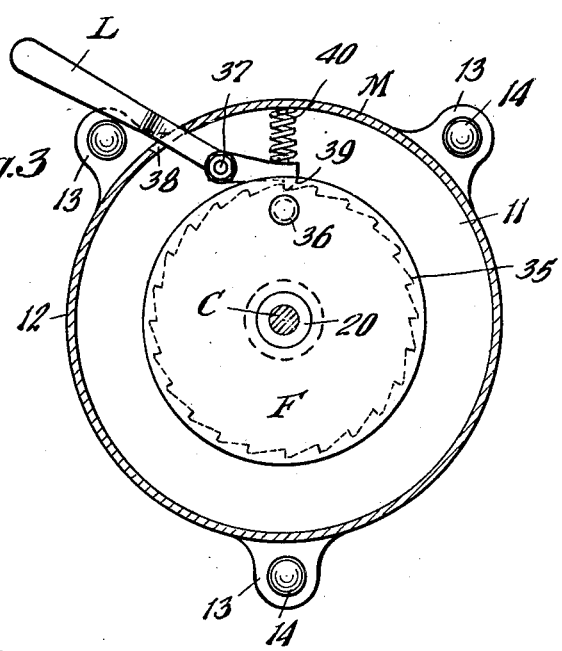

In the drawing forming a part of this specification, Figure 1 is a front elevational view of a hand brake mechanism, illustrating my improvements in connection therewith, the operating hand wheel being shown in dotted lines and the brake mechanism being illustrated as mounted on the end wall of a railway car. Figure 2 is a vertical, transverse sectional view corresponding substantially to the line 2—2 of Figure 1. Figure 3 is a vertical, sectional view, in the plane of the end wall of the car, corresponding substantially to the line 3—3 of Figure 2.

My improved hand brake mechanism is illustrated as mounted on the vertical end wall of a railway car, the end wall being designated by 10 and the brake mechanism proper being enclosed within a housing secured to said end wall.

The improved hand brake mechanism comprises broadly a chain winding drum A; a hand wheel B; an operating shaft C; a driving gear D; a driven gear E; a planetary carrier F; a planetary gear G; at ratchet H; a locking dog K; a locking dog L for the planetary carrier; and a housing M within which the brake mechanism is contained.

The housing M is preferably composed of two parts 11 and 12, the part 11 being in the form of a substantially flat plate member having three spaced securing lugs 13—13—13. The part 12 of the housing forms a cover member in the form of a casing, which is secured to the plate 11, the casing 12 being provided with three securing ears or lugs 13—13 similar to the lugs of the plate 11 and registering therewith. The two parts of the housing are secured together by rivets 14—14 extending through the securing lugs or ears 13—13 of the parts 11 and 12 of the housing. As shown, the rivets 14 preferably also extend through the end wall 10 of the car and serve to fix the housing to said end wall. The part 12 of the housing comprises an inner substantially cylindrical section 15 corresponding in size to the plate 10. Outwardly of the section 15, the part 12 of the housing is reduced in size, as indicated at 16, the last named portion of the housing serving to enclose the chain winding drum and associated parts of the brake mechanism. As most clearly shown in Figure 2, the reduced portion 16 of the housing is open at the bottom, as indicated at 17, to accommodate the brake chain 18, which is connected to the chain winding drum and the brake mechanism proper of the car, not shown.

The operating shaft C of my improved hand brake mechanism is journaled in the front and rear walls of the housing, the shaft C having a reduced cylindrical section 19 at the rear end thereof rotatably supported in a bearing boss 20 projecting inwardly from the plate 11. Adjacent the outer end, the shaft C is also provided with a reduced cylindrical bearing portion 21 rotatable in a thickened bearing member 22 on the front wall of the section 16 of the housing. Outwardly of the bearing portion 21, the shaft C is provided with an angular projecting portion 23 of tapered form, on which the hand wheel B is mounted, the latter being provided with an opening corresponding to the part 23 of the shaft. The hand wheel B may be locked to the shaft C in any suitable manner and as shown is held thereto by a securing nut 24 on the outer end of the shaft. Inwardly of the bearing portion 21, the shaft C has a section 25 of square formation on which the ratchet member H is mounted. The square portion 25 is preferably of larger size than the cylindrical section 21 of the shaft. At the inner portion of the shaft C, immediately adjacent the bearing section 19 thereof, the shaft is formed with a second portion of substantially square cross section, as indicated at 26, preferably corresponding in size to the square portion 25. Between the square portions 25 and 26, the shaft C is of cylindrical shape, as indicated at 27, preferably corresponding in diameter to the diagonals of the square sections.

The chain winding drum A is rotatably supported on the cylindrical section 27 of the shaft C having bearing openings 28—28 at the front and rear portions thereof rotatably accommodating the shaft C. As shown, the drum A has a winding portion of conical formation for the chain 18, the latter being secured to the drum by means of a pin 29 extending through the end link of the chain and alined openings in an annular flange 30 at the outer end of the drum and a lug 31 formed on the conical portion of the same. At the inner end, the drum is provided with a substantially disc-like section 32, which forms the gear member E. The disc portion 32 has an annular flange 33 at right angles thereto provided with internal gear teeth 34.

The driving gear D is secured directly to the shaft C and is mounted on the square portion 26 thereof having its front face bearing on the inner end of the drum proper and its rear face bearing on the outer end of the boss 20 on the plate 11.

The planetary carrier F is in the form of a relatively heavy disc journaled on the boss 20, and freely rotatable thereon. The planetary carrier F is provided with a peripheral set of ratchet teeth 35 which cooperate with the locking dog L. As most clearly shown in Figure 3, the ratchet teeth 35 are so designed that when the locking dog L is engaged therewith rotation of the carrier is prevented in a clockwise direction. The gear G, which is of larger diameter than the driving gear D, is rotatably mounted on the planetary carrier F by means of a stub shaft 36, which is fixed to the carrier, the inner end of the stub shaft being screw threaded, as shown, and engaged within a screw threaded opening of the carrier. The stub shaft is headed at the outer end to retain the gear G in position. As shown, the gear G meshes with the internal gear teeth 34 of the gear E and also with the teeth of the driving gear D.

The locking dog L, which cooperates with the planetary carrier F is pivotally supported on a pivot member 37 fixed to the rear wall of the housing and has an operating handle extending through an opening 38 provided in the side wall of the housing. At the inner end, the dog L is provided with a tooth 39, which cooperates with the ratchet tooth 35 of the carrier F. The dog L is yieldingly urged into engagement with the ratchet tooth 35 by means of a spring 40 interposed between the inner end of the dog and the opposed side wall of the housing.

Backward rotation of the hand wheel and associated parts is prevented by the locking dog K, which is pivotally supported on a pin 41 fixed to the front wall of the reduced section 16 of the housing, the dog having an operating hand grip extending through an opening provided in the side wall of the housing section 16. At the inner end the dog is provided with a tooth 42, which cooperates with the ratchet member H and prevents rotation of the same in a contra-clockwise direction, as viewed in Figure 1. The dog is held yieldingly engaged with the ratchet member H by means of a spring 43 interposed between the top wall of the housing section 16 and the toothed end of the dog.

In winding the chain to tighten the brakes, the operation of my improved hand brake mechanism is as follows: The operating hand wheel B is rotated in a clockwise direction, as viewed in Figure 1, thereby effecting rotation of the shaft C and the driving gear D, which is fixed thereto. During the chain winding operation, the locking dog L, which is yieldingly held in engagement with the ratchet tooth 35 of the planetary carrier F, prevents rotation of the carrier in a clockwise direction, as viewed in Figures 1 and 3. Inasmuch as the carrier F is held against rotation in a clockwise direction, the gear D meshing with the planetary gear G causes the latter to rotate in a contra-clockwise direction. As will be evident, planetary rotation of the gear G is prevented at this time due to the carrier F being locked. The gear G in turn causes rotation of the internal gear member E, which is fixed to the chain winding drum, thereby rotating the chain winding drum in a contra-clockwise direction and winding the chain thereon. During the chain tightening operation, the locking dog K, which cooperates with the ratchet member H, positively prevents backward rotation of the shaft C and the chain winding drum through the intermeshing gears, while permitting ratcheting action in a chain winding direction. Due to the difference in diameter of the driving gear D and the driven gear E, the power applied will be greatly multiplied to tighten the brakes.

In releasing the brakes, the operator disengages the locking dog L from the ratchet tooth 35 of the planetary carrier F, thus permitting rotation of the carrier and planetary movement of the gear G about the axis of the shaft C. As will be obvious, the chain winding drum is thus permitted to rotate freely to unwind the chain therefrom while the hand wheel B remains locked stationary by the dog K, which cooperates with the ratchet member H. In case it is found desirable to back up or ease off the brakes instead of quickly releasing the same, the locking dog L is left engaged with the ratchet teeth of the planetary carrier F and the locking dog K is disengaged from the ratchet member H. As will be evident, manipulation of the hand wheel B is thus permitted by the operator to ease off the brakes, the load at this time being transmitted through the intermeshing gears D, E and G.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a chain winding drum; of a hand wheel; means for transmitting power from the hand wheel to the drum including a planetary gear means; releasable ratchet means for holding said hand wheel and power transmitting means against backward rotation; and locking means for holding said planetary gear means against planetary movement while the hand wheel is rotated to wind the chain on the drum, said locking means being releasable to permit planetary movement of said gear means and free unwinding movement of the chain winding drum with respect to the hand wheel while the latter is held against backward movement by the ratchet means.

2. In a hand brake mechanism, the combination with a chain winding drum; of a hand wheel; power-multiplying gear means operatively connecting the hand wheel and chain winding drum, said gear means including members mounted for planetary movement and with respect to which said hand wheel is rotatable during the entire chain-winding operation; means for normally locking said members against planetary movement, whereby the power is transmitted through said gear means to the drum to wind the chain and tighten the brakes, said locking means being releasable to permit planetary movement of said members, thereby allowing free running of the chain winding drum with respect to the hand wheel to release the brakes.

3. In a hand brake mechanism, the combination with a hand wheel; of a chain winding drum; means for transmitting power from the hand wheel to the chain winding drum including gear elements rotatable with said hand wheel and drum respectively, said hand wheel being rotatable with respect to said drum gear at all times during the chain winding operation; and planetary gear means operatively connecting said gear elements; a rotatable carrier for said planetary gear means; locking means for holding said carrier against rotation, whereby said power transmitting means effects winding of the chain when the hand wheel is rotated in a chain winding direction, said locking means being releasable to permit rotation of said carrier and planetary movement of said planetary gear means to allow free rotation of the chain winding drum with respect to said hand wheel to release the brakes.

4. In a hand brake mechanism, the combination with a rotary chain winding drum; of a rotary hand wheel; intermeshing power multiplying gear elements connecting said hand wheel and drum, said elements being relatively rotatable during the entire chain winding operation, said elements including an element mounted for bodily movement with respect to the other elements; means for normally locking said bodily movable element against bodily movement during the chain winding operation, said locking means when unlocked permitting bodily movement of said last named element with respect to the other gear elements and free running of the chain winding drum with respect to the hand wheel to release the brakes.

5. In a hand brake mechanism, the combination with a chain winding drum; of a hand wheel; means for transmitting power from the hand wheel to the drum including a planetary gear means; locking means for holding said planetary gear means against planetary movement while the hand wheel is rotated to wind the chain on the drum, said locking means being releasable to permit planetary movement of said gear means and free unwinding movement of the chain winding drum with respect to the hand wheel; and a locking dog for positively holding said hand wheel against rotation in an unwinding direction.

6. In a hand brake mechanism, the combination with a chain winding drum having an internal gear member fixed thereto; of a rotary hand wheel; a shaft fixed to said hand wheel; a gear fixed to said shaft; a carrier rotatable about the axis of said shaft; a planetary gear rotatably mounted on said carrier and meshing with said internal gear and the gear on said shaft; a releasable means for holding said carrier against rotation while the brakes are being applied, said means being releasable to permit planetary rotation of said carrier to release the brakes; and means for preventing rotation of the hand wheel in chain unwinding direction while said drum is unwinding.

7. In a hand brake mechanism, the combination with a hand wheel; of a chain winding drum; means for transmitting power from the hand wheel to the chain winding drum, including gear elements rotatable with said hand wheel and drum respectively; and planetary gear means operatively connecting said gear elements; a rotatable carrier for said planetary gear means; locking means for holding said carrier against rotation, whereby said power transmitting means effects winding of the chain when the hand wheel is rotated in a chain winding direction, said locking means being releasable to permit rotation of said carrier and planetary movement of said planetary gear means to allow free rotation of the chain winding drum with respect to said hand wheel to release the brakes; and a locking dog for positively holding said hand wheel against rotation in an unwinding direction.

8. In a hand brake mechanism, the combination with a rotary chain winding drum; of a rotary hand wheel; intermeshing power multiplying gear elements connecting said hand wheel and drum, including an element mounted for bodily movement with respect to the other elements; means for normally locking said bodily movable element against bodily movement during the chain winding operation, said locking means when unlocked permitting bodily movement of said last named element with respect to the other gear elements and free running of the chain winding drum with respect to the hand wheel to release the brakes; and a locking dog for positively holding said hand wheel against rotation in an unwinding direction.

9. In a hand brake mechanism, the combination with a chain winding drum; of an operating hand wheel; gear members rotatable with said drum and hand wheel respectively; a carrier mounted for rotation with respect to said gear members; manually actuated withdrawable releasable means engageable with the carrier for locking said carrier against rotation; and planetary gear means rotatably mounted on said carrier and meshing with said gear members.

10. In a hand brake mechanism, the combination with a chain winding drum; of an operating hand wheel; gear members rotatable with said drum and hand wheel respectively; a carrier mounted for rotation with respect to said gear members; planetary gear means rotatably mounted on said carrier and meshing with said gear members; a locking dog for normally holding said carrier against rotation; and manually operated means for disengaging said dog from the carrier to permit free rotation of the carrier and planetary movement of the gear means carried thereby to allow free rotation of the chain winding drum with respect to the hand wheel and release of the brakes.

11. In a hand brake mechanism, the combination with an operating shaft; a hand wheel for rotating said shaft; a chain winding drum; gear elements rotatable respectively with said drum and shaft; a carrier rotatable about the gear of the operating shaft; a gear rotatable on said carrier and meshing with said first named gears; a locking dog for said carrier, said dog being movable toward and way from the carrier and normally engageable therewith and holding the same against rotation; and means on said dog for operating the same to withdraw it from locking position and thereby allow free rotation of said carrier and release of the brakes.

12. In a hand brake mechanism, the combination with a rotary operating shaft; of a hand wheel for rotating said shaft in chain winding direction; ratchet means for holding said hand wheel against rotation in chain unwinding direction; a chain winding drum; gears fixed to said drum and shaft respectively; a planetary carrier; a gear rotatably supported on the carrier and meshing with said first named gears; ratchet means for holding said carrier against rotation in a direction corresponding to the chain winding direction of said shaft; and means for releasing said last named means from engagement with the carrier to permit free planetary rotation of said carrier and release of the brakes.

13. In a hand brake mechanism, the combination with an operating shaft; of a hand wheel for rotating said shaft; a gear fixed to said shaft; a carrier rotatable about said shaft; a planetary gear rotatable with the carrier and meshing with said first named gear; a chain winding drum; gear means for transmitting the power from said planetary gear to the chain winding drum; means for locking said carrier against movement while the brakes are being applied; and manually operated means for releasing said locking means to permit planetary movement of said planetary gear and free running of the drum with respect to the hand wheel to release the brakes.

14. In a hand brake mechanism, the combination with an operating shaft; of a hand wheel for rotating said shaft; a gear fixed to said shaft; a carrier rotatable about said shaft; a planetary gear rotatable with the carrier and meshing with said first named gear; a chain winding drum; gear means for transmitting the power from said planetary gear to the chain winding drum; means for locking said carrier against movement while the brakes are being applied, said locking means being releasable to permit planetary movement of said planetary gear and free running of the drum with respect to the hand wheel to release the brakes; a ratchet wheel fixed to said shaft; and a locking pawl cooperating with said ratchet to prevent rotation of the hand wheel in an unwinding direction.

15. In a hand brake mechanism, the combination with a chain winding drum; of a hand wheel; means for transmitting power from the hand wheel to the drum, including planetary gear means, comprising a gear element mounted for movement about the axis of said drum and with respect to which the hand wheel is rotatable at all times during the brake tightening operation; locking means for normally holding said gear against movement about said axis to thereby effect winding of the chain on the drum, said locking means being releasable to permit movement of said gear member about said axis and free unwinding movement of the chain winding drum with respect to the hand wheel.

16. In a hand brake mechanism, the combination with a rotatable chain winding drum; of manually actuated rotary driving means; intermeshing power-multiplying gears operatively connecting said driving means and drum, all of said gears being mounted for movement about the axis of the drum, one of said gears being operatively connected with said driving means and coaxial with said drum, another of said gears being operatively connected to the drum to effect movement of the latter, and still another of said gears with respect to which the hand wheel is rotatable at all times during tightening of the brakes, said last named gear being interposed between said first named gears; and releasable holding means for normally holding one of said gears against movement about the axis of the drum, said holding means being releasable to permit free movement of said last named gear about said axis, thereby permitting free running of the chain winding drum with respect to the driving means and quick release of the brakes without rotation of said driving means.

17. In a hand brake mechanism, the combination with a rotatable chain winding drum; of manually actuated rotary drive means; a driving gear rotatable with said drive means; intermeshing power multiplying gears with respect to which said drive gear is rotatable at all times during the chain winding operation, said power multiplying gears operatively connecting said driving gear and drum and including a gear element normally held against movement about the axis of said drum and gear means operatively connected to said drum meshing with said gear element; and means for normally holding said gear element against movement about the axis of the drum, said means being releasable to permit movement of said element about the axis of said drum, thereby permitting relative rotation of the drum and driving gear to release the brakes.

In witness that I claim the foregoing I have hereunto subscribed my name this 10th day of July, 1930.

WILLIAM A. HEITNER.